L. H. COBB.
RESILIENT SEAT SUPPORT.
APPLICATION FILED FEB. 5, 1914.
1,122,691. Patented Dec. 29, 1914.
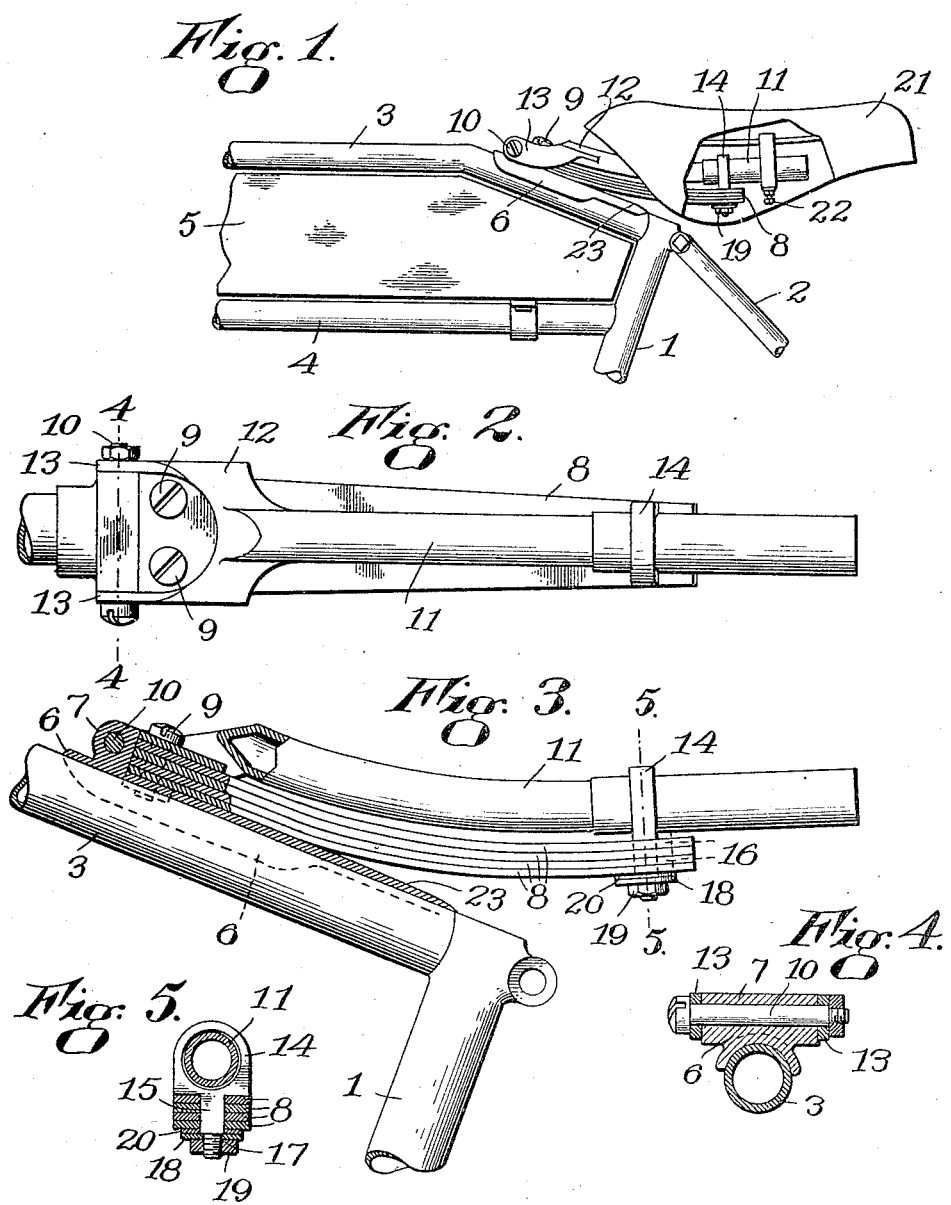

UNITED STATES PATENT OFFICE.

LYMAN H. COBB, OF FITCHBURG, MASSACHUSETTS, ASSIGNOR TO MARY ELIZABETH JOHNSON, TRUSTEE, OF FITCHBURG, MASSACHUSETTS.

RESILIENT SEAT-SUPPORT.

1,122,691.  Specification of Letters Patent.  Patented Dec. 29, 1914.

Application filed February 5, 1914. Serial No. 816,862.

*To all whom it may concern:*

Be it known that I, LYMAN H. COBB, a citizen of the United States, residing at Fitchburg, in the county of Worcester and Commonwealth of Massachusetts, have invented a new and useful Improvement in Resilient Seat-Supports, of which the following, together with the accompanying drawing, is a specification.

My invention relates to resilient seat supports and is particularly useful for supporting the seats or saddles of motorcycles, ordinary bicycles and the like.

The present invention is an improvement upon the invention described in my co-pending application for patent upon a "resilient seat support", Serial No. 807,539, filed December 18, 1913.

One object of the present invention is to provide an improved form of resilient seat support which shall be simple and compact and at the same time comfortable for the rider.

Other objects and advantages will appear from the following description taken in connection with the accompanying drawing, in which—

Figure 1 is a view of a portion of a motorcycle frame with its seat carried upon a support constructed in accordance with the present invention; Fig. 2 is a plan view of the seat support, the seat being removed; Fig. 3 is a side view of the seat support and a portion of the frame carrying it, part of the support being in section to show details of construction; Fig. 4 is a sectional view on the line 4—4 of Fig. 2; and Fig. 5 is a sectional view on the line 5—5 of Fig. 3.

Like reference characters refer to similar parts in the different figures.

As shown in the drawing, the frame of the motorcycle includes a seat post tube 1, a rear fork 2, a backbone 3 and a brace 4, the fuel tank 5 being supported between the backbone 3 and the brace 4.

The resilient seat support which embodies my invention includes an attaching member 6 brazed to the rear end of the backbone 3 of the frame. This attaching member 6 is provided at its forward end with an upstanding lug 7. A plurality of superimposed leaf springs 8 are secured by screws 9 passing through the forward ends to the attaching member 6 immediately behind the lug 7. The springs 8 extend rearwardly toward and preferably beyond the rear end of the attaching member 6 and the top of the seat post tube 1 and they are curved upwardly so as to leave a free space between their rear ends and the rear end of the attaching member 6. The lug 7 is perforated to receive and support a bolt 10.

Spaced slightly above the upper leaf spring 8 and preferably curved concentrically therewith is a tube 11 extended at its forward end into a plate 12 having downturned parallel ears 13, these ears being spaced to straddle the lug 7 and the forward ends of the leaf springs 8 and being pivoted upon the opposite ends of the bolt 10. The rear end of the tube 11 is loosely surrounded by a block 14 having an integral projection 15 which passes through slightly elongated slots 16 formed longitudinally through the rear ends of the leaf springs 8. The projection 15 is provided with a shoulder 17 to receive a washer 18 held against the shoulder by a nut 19 threaded onto the lower end of the projection. A washer 20 of leather, or other suitable material, is interposed between the washer 18 and the lowermost leaf spring 8 so as to reduce any noise produced by vibration. The shoulder 17 is located so as to prevent the washer 18 from pressing tightly against the leaf springs 8 so as to cause them to bind, and the longitudinal elongation of the slots 16 allows the rear ends of the leaf springs 8 to slide upon each other as they are bent downwardly by the weight of the rider. The block 14 maintains the tube 11 and the leaf springs 8 in proper relative positions. The rear end of the tube 11 is extended beyond the leaf springs 8 so that any common form of seat or saddle 21 may be attached to it as by means of a set screw 22, the wall of this portion of the tube being reinforced to withstand the pressure of the set screw.

In order to accommodate the combined strength of the leaf springs 8 to the weight of the rider and to the character of the surface over which the machine is to be ridden, the number of leaf springs 8 may be varied at will, it being a simple matter to add or remove these springs after removing the screws 9.

The attaching member 6 is extended rearwardly along the backbone 3 to afford a bearing surface 23 with which the lower leaf spring 8 contacts as the springs are depressed by the weight of the rider, the resistance of the springs increasing as they are bent because their effective length is shortened. Therefore, when the proper number of leaf springs is used, they will furnish a support for the seat which will be very resilient and comfortable under normal riding conditions, without permitting the seat or its support, however, to strike any rigid stop so as to jar the rider even while passing over very uneven surfaces. The rear end of the backbone 3 and the attaching member 6 are inclined downwardly and rearwardly so that the rear end of the tube 11 which supports the seat may lie substantially horizontally and support the seat in its proper position. The method of attaching the seat supporting springs 8 and tube 11 to the frame of the machine also gives a compact, secure construction. The rear end of the attaching member 6 lies just forwardly of the upper end of the seat post tube 1 so that any ordinary type of seat may be substituted at any time, if desired, for the tube 11 and the supporting springs 8.

While I have shown and described the details of one form of my invention, I do not wish to be limited to such details as changes may be made without departing from the spirit of the invention; but Having described my invention, what I claim as new and desire to secure by Letters Patent is:

1. A seat support including an integral attaching member having an upstanding lug, a seat supporting member pivoted at one end to said lug, and a leaf spring secured at one end to the attaching member close to the lug and separated from the attaching member at its other end to leave a space between them, the free end of the seat supporting member being supported by the free end of the spring.

2. A seat support including an attaching member having an integral upstanding lug, a seat supporting member pivoted at one end to said lug, and a plurality of leaf springs secured at one end to the attaching member close to the lug and separated from the attaching member at the other end to leave a space between the free ends of the attaching member and springs, the free end of the seat supporting member being supported by the free ends of the springs.

3. A seat support including an attaching member having an upstanding lug, a seat supporting member pivoted at one end to said lug, and a plurality of leaf springs detachably secured at one end to the attaching member near the lug and separated from the attaching member at the other end to leave a space between the free ends of the attaching member and springs, the free end of the seat supporting member being supported by the free ends of the springs.

4. In a cycle, a frame including a backbone, an attaching member secured to the backbone at a point spaced from the rear end of the backbone, a rigid seat supporting member pivoted at one end to the attaching member, and resilient means for supporting the free end of the seat supporting member.

5. In a cycle, a frame including a backbone, an attaching member secured to the backbone at a point spaced from the rear end of the backbone, a rigid seat supporting member pivoted at one end to the attaching member, and a leaf spring between the attaching member and the seat supporting member for supporting the latter, the attaching member being extended to provide a bearing surface for the spring to contact with as it is bent downwardly by the weight of the rider.

6. In a cycle, a frame including a backbone, an attaching member secured to the backbone at a point spaced from the rear end of the backbone, a rigid seat supporting member pivoted at its forward end to the attaching member, a leaf spring attached at its forward end to the attaching member and extending rearwardly to support the free rear end of the seat supporting member, the attaching member being extended rearwardly below the leaf spring and being spaced therefrom to provide a bearing surface for the spring to contact with as it is bent downwardly by the weight of the rider.

7. In a cycle, a frame including a backbone and a seat post tube, an attaching member permanently secured to the backbone, and seat supporting means carried entirely by the attaching member, the attaching member being located entirely outside of the line of the opening in the upper end of the seat post tube to allow a seat post to be inserted in said tube when desired.

Dated this thirtieth day of January, 1914.

LYMAN H. COBB.

Witnesses:
PENELOPE COMBERBACH,
NELLIE WHALEN.